(12) United States Patent
Hernandez Ferre et al.

(10) Patent No.: US 11,777,371 B2
(45) Date of Patent: Oct. 3, 2023

(54) GENERATOR STIFFENER RING

(71) Applicant: General Electric Renovables Espana, S.L., Barcelona (ES)

(72) Inventors: Alejandro Hernandez Ferre, Barcelona (ES); Thomas Drots, Nantes (FR); Pablo Pozo Torres, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/691,476

(22) Filed: Mar. 10, 2022

(65) Prior Publication Data

US 2022/0294312 A1 Sep. 15, 2022

(30) Foreign Application Priority Data

Mar. 12, 2021 (EP) .................................... 21382201

(51) Int. Cl.
| | | |
|---|---|---|
| *H02K 5/16* | (2006.01) | |
| *H02K 7/18* | (2006.01) | |
| *H02K 15/02* | (2006.01) | |

(52) U.S. Cl.
CPC .............. *H02K 7/183* (2013.01); *H02K 5/16* (2013.01); *H02K 15/02* (2013.01)

(58) Field of Classification Search
CPC ...... H02K 15/0006; H02K 5/16; H02K 15/02; H02K 7/183; H02K 1/18; H02K 1/12; H02K 3/522; H02K 1/22; H02K 7/1838; H02K 21/12; H02K 15/03; H02K 15/061; H02K 3/50; H02K 3/47; H02K 2213/03; H02K 2213/09; H02K 15/0068
See application file for complete search history.

(56) References Cited

U.S. PATENT DOCUMENTS

| | | |
|---|---|---|
| 7,884,493 B2 | 2/2011 | Buskirk et al. |
| 7,944,076 B2 | 5/2011 | Stiesdal |
| 8,089,175 B2 | 1/2012 | Stiesdal |
| 8,669,672 B2 | 3/2014 | Stiesdal |
| 8,766,467 B2 | 7/2014 | Thomsen |

(Continued)

FOREIGN PATENT DOCUMENTS

GB 1110420 A 4/1968

OTHER PUBLICATIONS

European Search Report Corresponding to EP21382201.8 dated Aug. 23, 2021.

*Primary Examiner* — Leda T Pham (74) *Attorney, Agent, or Firm* — Dority & Manning, P.A.

(57) ABSTRACT

The present disclosure relates to electrical machines comprising a rotor (13), a stator (12) and a radial air gap (39) between the rotor (13) and the stator (12), wherein one of the rotor and stator comprises an endplate driven on one side of the electrical machine, a central support (32) radially surrounding the other of the rotor (13) and stator (12), and a stiffener ring (33) on an opposite side of the electrical machine. The stiffener ring comprises an outer ring (34) connected to the central support (32), and an inner ring (35) connected to the outer ring (34). The outer ring (34) comprises a plurality of removably mounted outer segments (44). The present disclosure further relates to wind turbines and to methods for repairing parts of an electrical machine.

15 Claims, 7 Drawing Sheets

(56) References Cited

U.S. PATENT DOCUMENTS

| | | | |
|---|---|---|---|
| 8,981,609 B2 * | 3/2015 | Joeckel | H02K 15/024 |
| | | | 310/156.01 |
| 9,234,505 B2 | 1/2016 | Jensen | |
| 2014/0314580 A1 | 10/2014 | Lind et al. | |

* cited by examiner

GENERATOR STIFFENER RING

The present disclosure relates to electrical machines, and more specifically relates to generators for wind turbines, and to wind turbines comprising such generators. The present disclosure further relates to methods for accessing active parts of electrical machines, and more specifically wind turbine generators.

BACKGROUND

Electrical machines, such as motors and generators, generally comprise a rotor structure and a stator structure. Large electrical generators may be e.g. permanent magnet excited generators (PMG).

Such generators may be used for example in wind turbines. Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Such a direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, permanent magnet generators may also be coupled to a gearbox which increases the rotational speed of the generator to for example between 50 to 500 rpm or even more.

Electrical machines comprise a rotor which rotates with respect the stator. The rotor may be the inner structure and the stator the outer structure. The stator in this case thus surrounds the rotor. Alternatively, the configuration may be opposite of this, i.e. the rotor radially surrounds the stator.

In case of permanent magnet excited generators (PMG), permanent magnets (PM) are generally comprised in the rotor (although they could also be arranged alternatively in the stator structure), whereas winding elements (e.g. coils) are usually included in the stator (although they could alternatively be arranged in the rotor structure). Permanent magnet generators are generally deemed to be reliable and require less maintenance than other generator typologies. This is an important reason why permanent magnet generator are employed in offshore wind turbines, and particularly in direct drive offshore wind turbines.

Multiple permanent magnets may be provided in permanent magnet modules, which may be attached to the rotor as a single item. A permanent magnet module may be defined as a unit having a plurality of permanent magnets, such that the plurality of magnets can be mounted and unmounted together. Such a module may have a module base with a shape suitable for housing or carrying a plurality of permanent magnets that may be fixed to the base. The base may be configured to be fixed to a rotor structure such as a rotor rim in such a way that the plurality of magnets are fixed together to the rotor rim through the module base. The use of permanent magnet modules may facilitate the manufacturing of a rotor. Similarly, stator coils may be grouped together in coil modules. Coil modules may be fixed to a generator structure such as a stator rim.

In larger electrical machines, such as direct drive wind turbines, one side of the electrical machine may be closed off by an endplate. The other side of the electrical machines may be partially closed off by a stiffener flange. Such a stiffener flange extends radially partially inwards but is generally unsupported. The stiffener flange may be segmented such that segments of the flange can be temporarily removed to access active parts (permanent magnets and/or coils) for maintenance or repair.

SUMMARY

In an aspect of the present disclosure, an electrical machine is provided. The electrical machine comprises a rotor, a stator and a radial air gap between the rotor and the stator. One of the rotor and stator comprises an endplate on one side of the generator, a central support surrounding the other of the rotor and stator and further comprises a stiffener flange on an opposite side of the generator. The stiffener flange comprises an outer ring connected to the central support, and an inner ring connected to the outer ring. The outer ring comprises a plurality of removably mounted outer annular segments.

With an electrical machine according to this aspect, maintenance and repair of the rotor and stator can be facilitated. A removable outer segment can be removed for providing access to rotor and/or stator. The inner ring can provide sufficient stiffness such that during such an operation, the rotor does not deform and the air gap between stator and rotor is not compromised. Also weight of the structure may be optimized since a solution involving the increase in e.g. thickness or width of the stiffener ring to increase stiffness can be avoided.

Throughout the present disclosure, "removably mounted" shall mean that the components or segments that are removably mounted are mounted in such a way as to enable dismounting, or removing without damaging the components or segments or a surrounding structure. The components or segments may be mounted or attached with suitable fasteners like bolts or screws, or other, that allow removal of the fasteners and thereby disassembly or removal of a component or segment.

In a further aspect, a method for repairing a part of an electrical machine having a rotor, a stator and a radial air gap between the rotor and the stator is provided. The method comprises removing a segment of a stiffener ring on a side of the generator to create an opening in the stiffener ring and accessing the rotor and/or the stator though the opening in the stiffener ring wherein the stiffener ring is not supported at a radially inner end of the stiffener ring. The stiffener ring comprises an outer ring and an inner ring, and wherein removing the segment of the stiffener ring includes removing a segment of the outer ring, while the inner ring is not disassembled.

With a method according to this aspect, access can be provided to the generator rotor and/or stator to carry out repair. In examples, active parts of the rotor and/or stator may be removed and substituted.

In yet a further aspect, a wind turbine is provided, which comprises a wind turbine rotor including a plurality of blades, a generator rotor operatively connected to the wind turbine rotor and a generator stator arranged radially within the generator rotor. The generator rotor comprises a radial support at a front side rotatably mounted on a main frame, a rotor rim, and a stiffener ring at a back side of the generator rotor. The stiffener ring comprises an outer ring, and an inner ring, and wherein the outer ring comprises a plurality of removably mounted outer ring segments.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
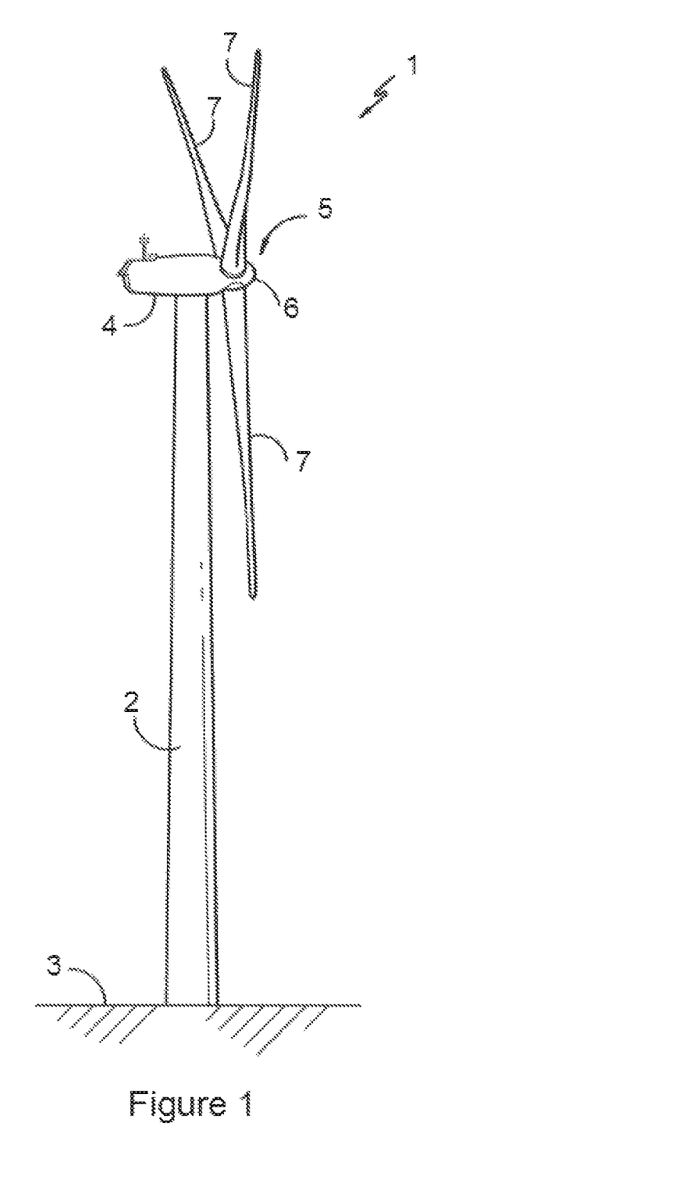
FIG. 1 schematically illustrates a perspective view of one example of a wind turbine.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. The rotation of the rotor may be directly transmitted, e.g. in direct drive wind turbines, or through the use of a gearbox to a generator.

Figure 2:
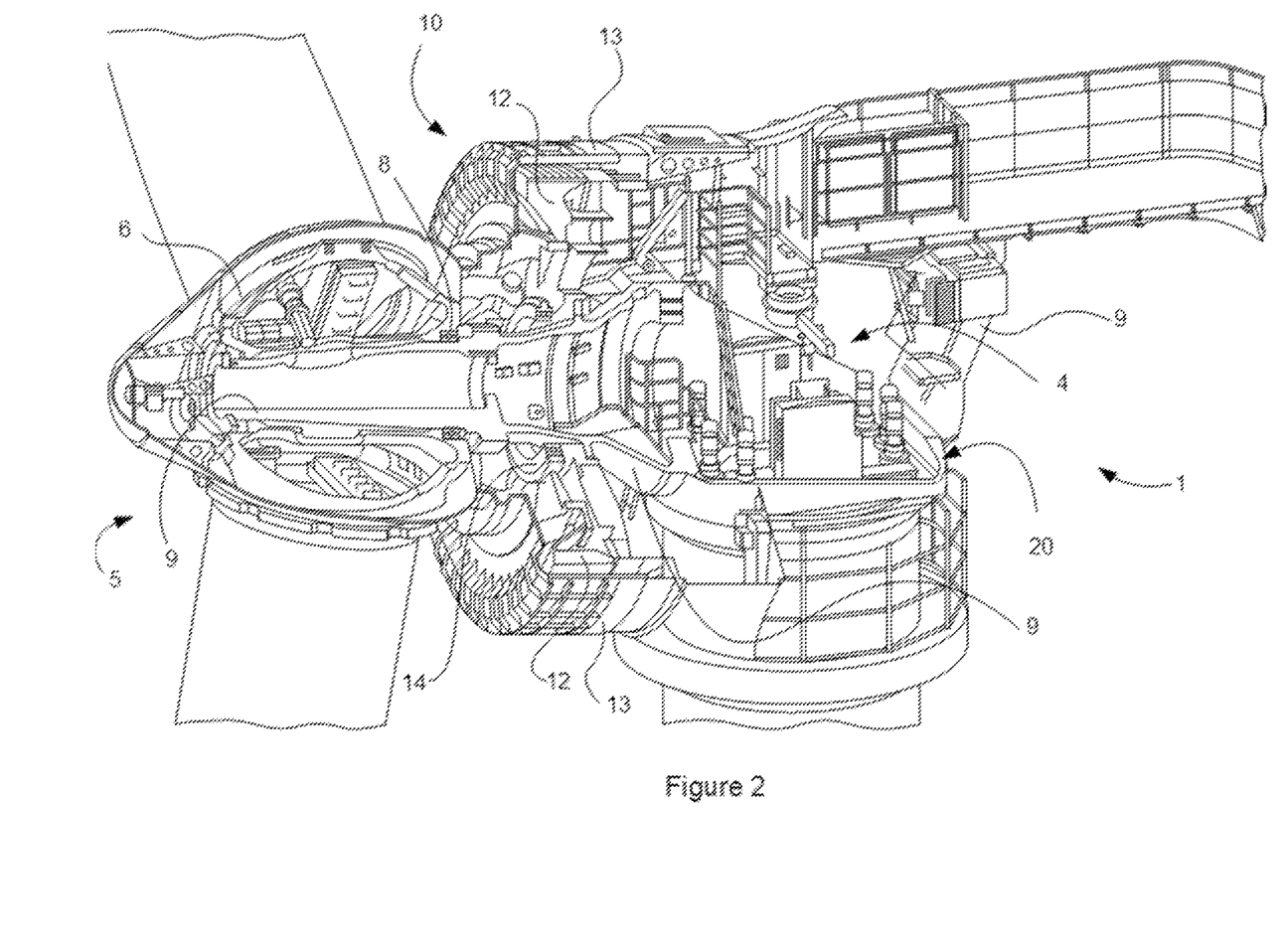
FIG. 2 illustrates an example of a direct drive wind turbine.

FIG. 2 illustrates a simplified, internal view of one example of a nacelle 4 of a direct drive wind turbine 1. As shown, the generator 10 may be disposed within the nacelle 4 or between the nacelle 4 and the rotor 5. In general, the generator 10 may be coupled to the rotor 5 of the wind turbine 1 for generating electrical power from the rotational energy generated by the rotor 5. For example, the rotor 5 of the wind turbine may include a hub 6 coupled to a rotor 9 of a generator 10 for rotation therewith. The rotation of the hub 6 may thus drive the rotor 12 of the generator 10.

In FIG. 2, the wind turbine rotor 5 may be rotatably mounted on a support frame 9 through rotor bearing 8 at a coupling region or a front side. The generator 10 may comprise a rotor 12 and a stator 13. The stator may be rigidly mounted on the support frame 9. The rotor may be rotatably mounted on the stator through a generator bearing 14 so that the rotor may rotate with respect to the stator around an axis.

The generator 10 may be electrically coupled to the converter. The wind turbine converter may adapt the output electrical power of the generator to the requirements of the electrical grid. In some examples, the converter may be placed inside the nacelle 4; however, in other examples it may be placed in other locations of the wind turbine.

It should be appreciated that the rotor 5 of the wind turbine and the generator 10 may be supported by a bedplate or a support frame 9 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to a first bearing component and the nacelle 4, e.g. the bedplate or support frame 9, is coupled to the second bearing component.

Figure 3:
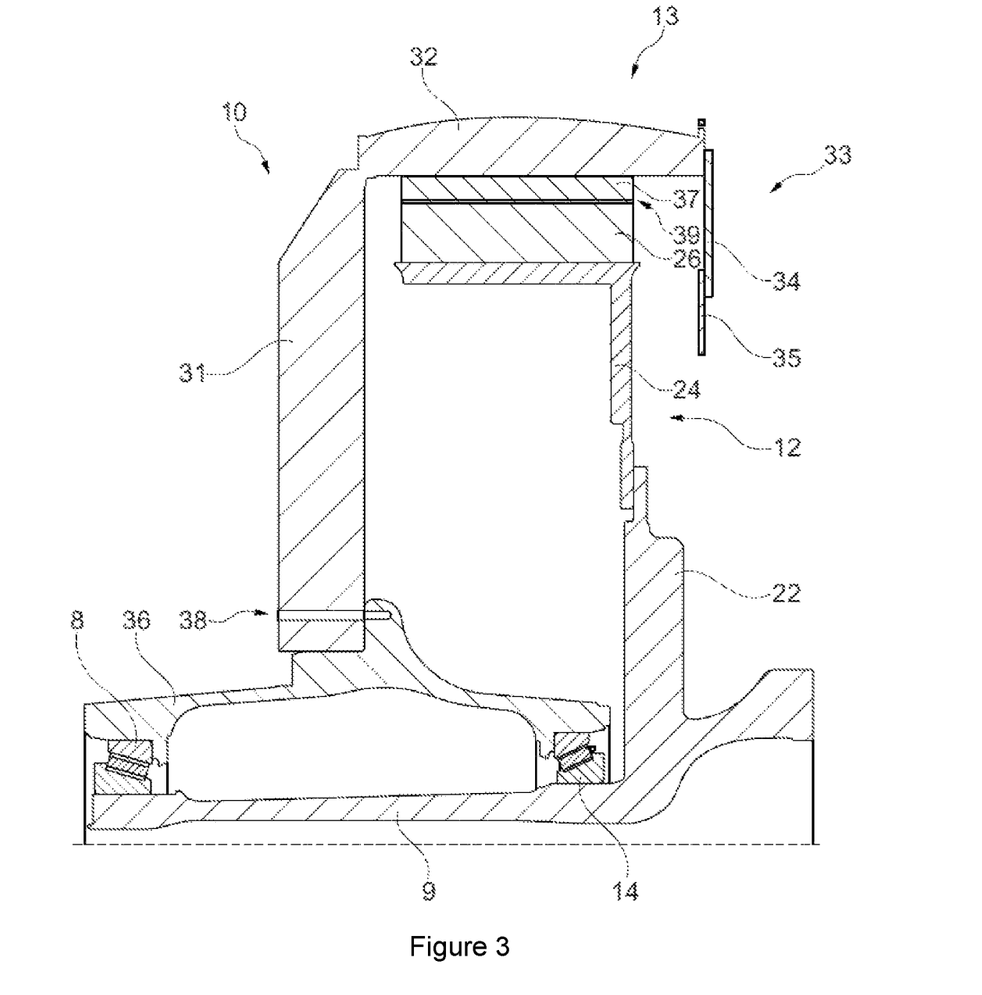
FIG. 3 schematically illustrates an example of a generator of a direct drive wind turbine.

FIG. 3 schematically illustrates an example of a generator of a wind turbine. In an aspect of the present disclosure, a wind turbine is provided, which comprises a wind turbine rotor 5 including a plurality of blades 7 (see FIGS. 1 and 2). The wind turbine also comprises a generator rotor 13 operatively connected to the wind turbine rotor 5 and a generator stator 12 arranged radially within the generator rotor 13. The generator rotor 13 comprises a radial support 31 at a front side rotatably mounted on a main frame 9, a rotor rim 32, and a stiffener ring 33 at a back side of the generator rotor. The stiffener ring 33 comprises an outer ring 34, and an inner ring 35, and wherein the outer ring 34 comprises a plurality of removably mounted outer ring segments 44 (see e.g. FIG. 4).

In the example of FIG. 3, the inner ring 35 is not supported at an inner side. In this example, the rotor which radially surrounds the stator is cantilever mounted and only supported on one side of the generator. In the example of FIG. 3, the generator rotor may be directly driven by the wind turbine rotor 5 i.e. there is no gearbox arranged between rotor (shaft) and generator rotor. In the example of FIG. 3, the rotor shaft 36 may be directly coupled to a hub 6 of the wind turbine, or the rotor shaft 36 may be an extension of the hub of the wind turbine.

In examples (as may be seen e.g. in FIG. 4), the outer ring may comprise 10-50 segments, specifically 20-40 segments. The optimum number of segments may be determined depending on a diameter of the generator rotor. A size of a segment may be chosen such that a single segment can be removed so that the rotor or stator of the generator can be accessed. In particular, segments may be shaped and sized that active parts can be removed through an opening created by removal of the segment. The active parts may be single coils, single permanent magnets, or coil modules or permanent magnet modules.

In examples, different outer segments may have different sizes. However, in order to optimize manufacturing and logistics, all outer segments may have the same size and same configuration.

In examples, the wind turbine may comprise a sealing between the removably mounted outer ring segments.

Figure 4:
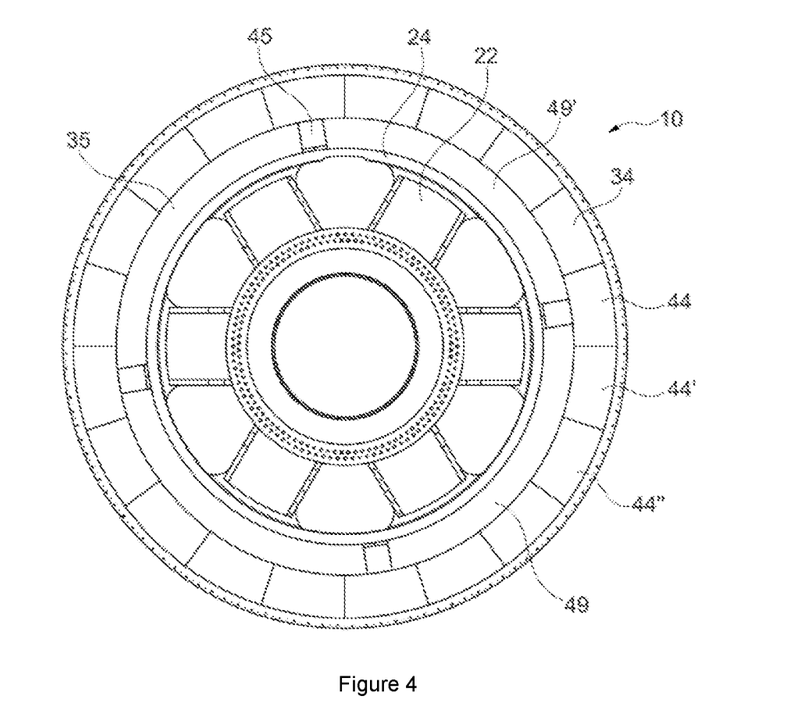
FIG. 4 schematically illustrates an axial view of an example of a generator.

Still with respect to FIGS. 3 and 4, in a further aspect, the present disclosure provides an electrical machine 10 comprising a rotor 13, a stator 12 and a radial air gap 39 between the rotor 13 and the stator 12. In accordance with this aspect, one of the rotor and stator comprises an endplate 31 on one side of the generator 10, a central support 32 and a stiffener flange 33 on an opposite side of the generator 10. The central support 32 is radially outside or radially surrounds the other of the rotor and stator. The stiffener ring or stiffener flange 33 comprises an outer ring ("annular flange") 34 connected to the central support 32, and an inner ring ("inner annular flange") 35 connected to the outer ring 34. The outer ring 34 comprises a plurality of removably mounted outer annular segments 44.

In the illustrated example, the rotor radially surrounds the stator and the rotor may form an overhanging structure. In other examples, the stator may radially surrounds the rotor. And in such a case, the stator may be cantilever mounted and comprises the ring-shaped endplate on one side, and a stiffener ring on the other side.

The endplate may be substantially ring-shaped or annular.

In the illustrated example, the electrical machine is a generator, and more specifically a generator of a wind turbine. In this example, the rotor is driven by a wind turbine rotor. In other examples, the electrical machine may be a motor.

The ring-shaped endplate 31 may close off a generator at one side, and in the example of FIG. 3, the front side of the generator i.e. the side of the generator where the rotor hub of the upstream wind turbine is mounted. The endplate 31 may be attached to a flange of a rotor shaft with suitable fasteners 37. The rotor shaft 36 is supported on a main frame 9. In the example of FIG. 3, the rotor shaft 36 may be rotatably mounted on the main frame 9 with a front bearing 8 and a rear bearing 14. In the example of FIG. 3, the front bearing 8 and rear bearing 14 may be single tapered roller bearings.

The stator may be mounted on the main frame 9. An inner support 22 may be integrally formed with the main frame 9. The inner support 22 radially extends outwards. A stator rim may be mounted to the inner support 22. In this particular example, the stator rim forms part of a central stator structure. The stator rim may carry stator coils 26. Sets of stator coils may be grouped in coil modules.

The endplate 31 and central support structure 32 may be integrally formed as shown in figure. The central support structure may form an external rotor rim carrying permanent magnets 37. Sets of permanent magnets 37 may be grouped together in permanent magnet modules.

Radially inwards of the stiffener ring 33, elements of the cooling system may be arranged such as cooling air ducts supplying cold air towards the generator and extracting the air after it has cooled the active parts and thereby has heated up. Further space is taken up by electrical cabling connected to the generator. Suitable sealing may be provided to control the atmosphere inside the generator and separate it from the rest of the nacelle.

The generator 10 may further comprise suitable covering, to protect and close off the generator (not shown in FIG. 3).

In FIG. 4, a rear view of the example of the generator 10 is shown. The inner support 22 and stator rim may be recognized in FIG. 4. Part of the stator central structure with rim and the active parts of the generator are closed off by the stiffener ring, comprising the outer ring or outer flange 34 and inner ring or inner flange 35.

Figure 5:
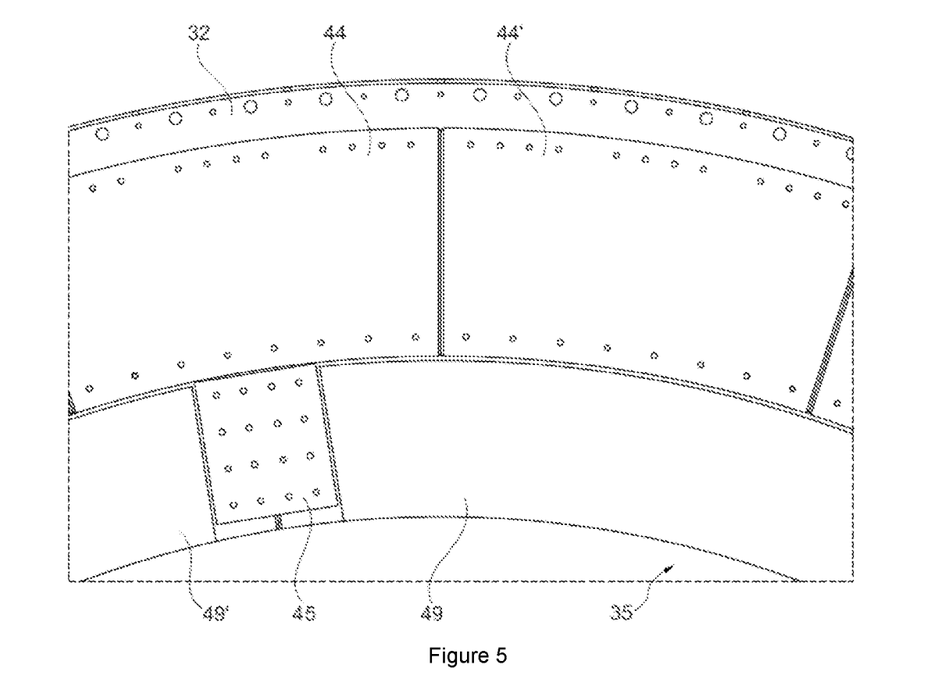
FIG. 5 schematically illustrates a detail of the example of the generator or FIG. 4.

As may be seen in FIGS. 4 and 5, the removably mounted outer annular segments 44, 44' may be mounted to the central support 32 and to the inner annular flange 35. The removably mounted annular segments 44, 44' may be mounted with removable fasteners such as bolts or screws. Central support or rotor rim 32 may comprise suitable fastener holes.

The inner ring 35 comprises a plurality of inner annular segments 49, 49', and joining plates 45, wherein the joining plates 45 are connected the inner annular segments 49, 49'. The inner ring may be built-up from several segments. Ergonomics, manufacturability and transportation may be improved using a segmented built-up of the inner annular flange.

The individual segments 49, 49' may have recessed areas at both ends. The joining plates 45 may be arranged on these recessed areas and may be secured through bolts or similar fasteners to neighboring inner annular segments 49, 49'.

In the example of FIGS. 3 and 4, the inner ring is not supported at a radially inner end. I.e. at the non-driven side of the generator rotor, the stiffener is not supported by a bearing or otherwise. As may be seen, the endplate on the other side of the generator is supported at its radial inner end. The main functions of the stiffener in these examples include providing stiffness but allowing access for repair and protecting an inside of the generator from the outside environment.

Figure 6:
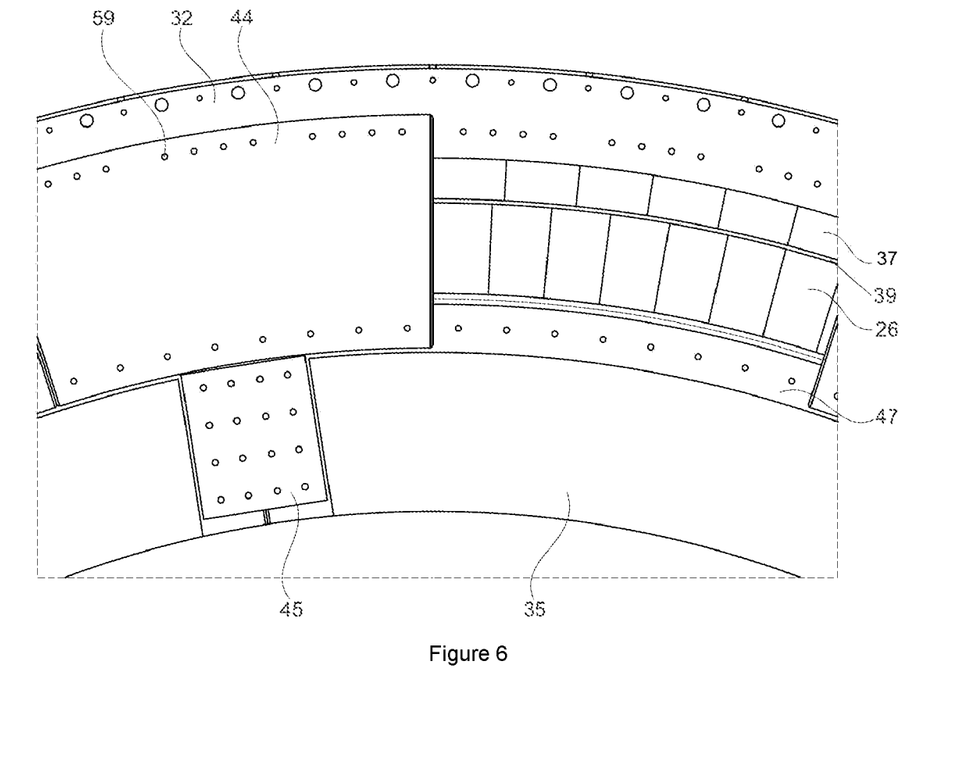
FIGS. 6 and 7 schematically illustrate examples of a method of repair of active parts of the generator of FIG. 4.

As may be seen in FIG. 6, in which one of the outer annular segments 44' has been removed, the outer annular segments 44, 44' may be positioned on top of recesses or recessed areas 47 at an outer end of the inner annular segments 49. Although not shown in FIGS. 4-6, the spaces between outer annular segments 44, 44' may be sealed off to maintain a protected environment inside the generator. Silicone may be used to seal off such spaces.

In some examples, the outer annular segments 44,44' may be configured for mounting of a tool for removing the annular outer segments. Similarly, the inner ring may be configured for mounting a tool for removing the outer annular segments.

A robot or other tool may be used to detach an annular outer segment from the support 32 and inner annular flange 35. To this end, the outer annular segments and/or the inner ring or flange 35 may be provided with suitable mounting holes 49 or fittings such that a robot or other tool can be attached. Once attached, the robot or other tool can remove fasteners, such as screws or bolts to release an outer annular segment, and disassemble the outer ring.

Figure 7:
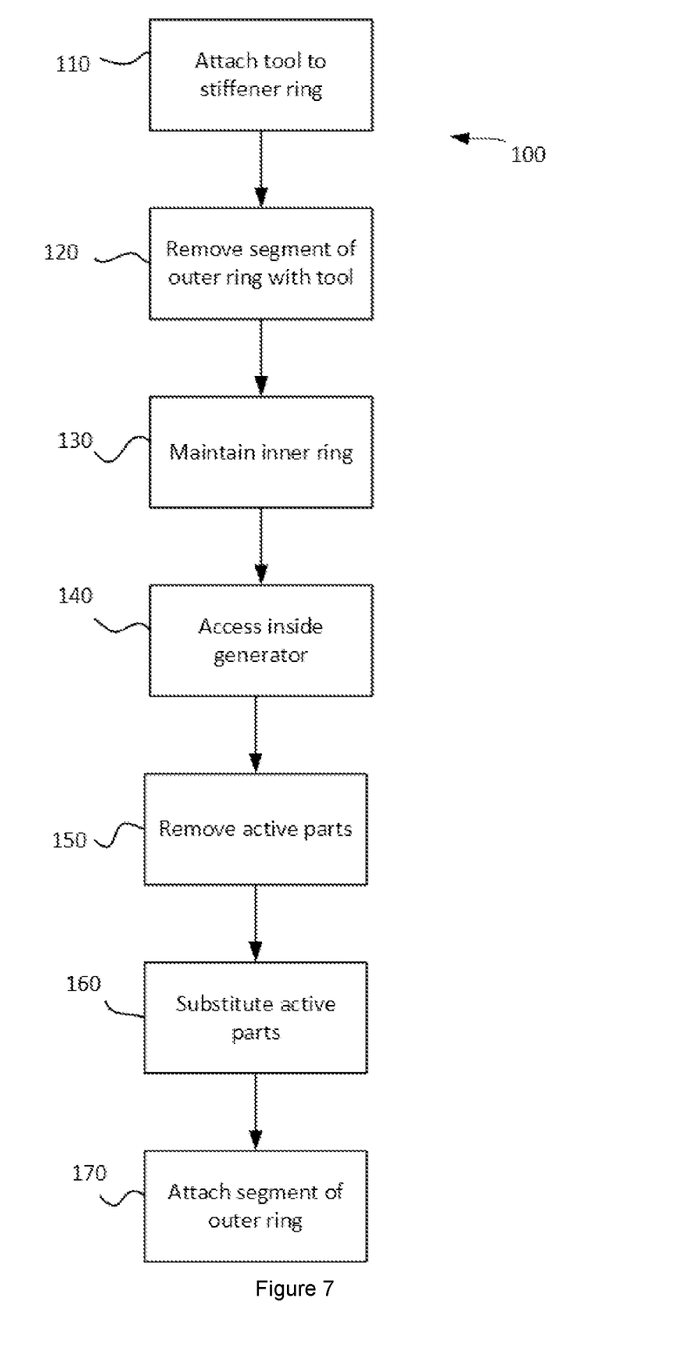

With reference specifically to FIGS. 6 and 7, the present disclosure further provides a method 100 for repairing a part of an electrical machine 10 having a rotor 13, a stator 12 and a radial air gap 39 between the rotor 13 and the stator 12. The method comprises removing a segment 44' of a stiffener ring 33 on a side of the generator 10 to create an opening in the stiffener ring 33. The stiffener ring is not supported at a radially inner end of the stiffener ring.

The method includes accessing the rotor 13 and/or the stator 12 though the opening in the stiffener ring 33. The stiffener ring 33 comprises an outer ring 34 and an inner ring 35, and wherein removing the segment 44' of the stiffener ring 33 includes removing a segment of the outer ring 34, while the inner ring 35 is not disassembled. An opening is thus created in the stiffener ring, which is at least partially delimited by the inner ring. In this example, the opening is delimited by the rim 32 or central support, a part of the inner ring, and neighboring outer annular segments.

In this example, the electrical machine 10 is a generator.

In some examples, one or more active parts of the generator 10 may be removed through the opening in the stiffener ring 33. Stator coils or coil modules or permanent magnets or permanent magnet modules may be removed through the opening. These active parts may be substituted by new active parts.

In some examples, more than one segment of the outer ring may be removed while the inner ring is not disassembled. In examples, multiple segments may be removed to access different sections of the generator at the same time.

In order not to compromise stiffness locally, specifically segments which are not adjacent may be removed at the same time.

In some examples, removing the segment of the outer ring may comprise mounting a tool to the stiffener ring, and disassembling the segment of the outer ring from other segments of the outer ring with the tool. A tool may be a robot, or other automated device which can be used for disassembling segments, specifically removing bolts or other fasteners of the segments. In examples, mounting the tool may comprise mounting the tool at least partially to the inner ring and/or segments of the outer ring.

An example of a method 100 for repairing a generator is illustrated in a block diagram in FIG. 7. At block 110, a tool may be attached to a stiffener ring of the generator. At block 120, a segment of the outer ring of the stiffener ring may be removed using the tool, while the inner ring of the stiffener, block 130, is now disassembled, i.e. it is maintained intact. The inner ring can thus provide sufficient stiffness and strength so that the generator rotor does not deform and the air gap is not compromised.

After one or more segments of the outer ring have been removed, access is provided to an inside of the generator, at block 140. In examples, an operator may reach inside the generator to inspect parts of the generator, specifically the active parts. In examples, small repairs may be carried out without the need to remove active parts.

In other examples, at block 150, one or more active parts may be removed through the opening created by removal of the outer ring segment. Then, at block 160, the removed active parts may be substituted by new parts. The same opening can be used to introduce the new parts and mount them to the stator or rotor. Finally, at block 170, the segment of the outer ring may be attached again. The segment may be assembled with the inner ring, and the rotor rim. Spaces between the segment and neighboring segments may be sealed. Once the repair or inspection has been completed, the wind turbine may resume normal operation.

In examples, the stiffener ring may cover between 20 and 60% of a diameter of the generator rotor. I.e. an inner 40-80% of the diameter of the generator is not covered by the stiffener ring.

In examples, the outer segments of the stiffener ring may have a width (in the radial direction) that is between 50 and 150% of a width in the radial direction of the inner segments. Specifically a width may be between 75 and 125% of a width of the inner segments. In the example of FIGS. 4-6, the outer segments have roughly the same width in radial direction as the inner segments, but the outer segments partially overlap the inner segments.

Figure 8:
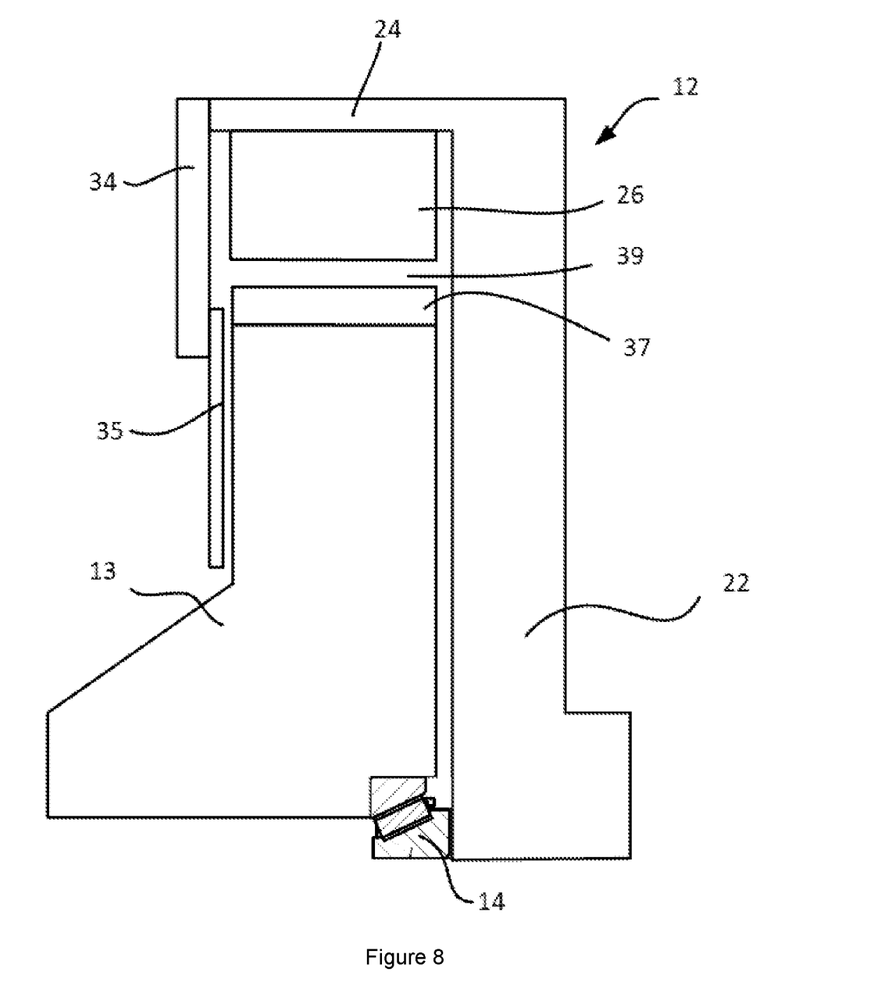
FIG. 8 schematically illustrates a further example of an electrical machine according to the present disclosure.

FIG. 8 illustrates a further example of an electrical machine. In this example, the electrical machine is a generator. The generator comprises a rotor 13 and a stator 12. The stator 13 radially surrounds the rotor 12, and forms an overhanging structure. The overhanging structure is supported on one side of the rotor (downstream from the generator rotor 13), and not supported on the other side (the upstream side of the generator rotor 13).

The rotor 12 is operatively connected to a wind turbine rotor (not shown, arranged on the upstream side, the left of FIG. 8). The rotor 12 is supported on stator 13 through one or more bearings 14. The rotor 12 may carry permanent magnets 37 on a rim of the rotor 12. The stator may include a plurality of electrical coils 26. A radial air gap 39 is arranged between rotor and stator.

On the unsupported side of the stator 12, a stiffener ring comprises an outer ring 34, and an inner ring 35. On the supported side of the stator 12, an endplate 22 closes off the generator. The stator 12 further comprises a central support 24 carrying the coils.

As for the rotor of FIG. 4, the outer ring 34 of the stiffener ring, comprises a plurality of removable outer segments. When access is needed to an inside of the generator to inspect, repair or substitute active parts of the generator, one or more of the segments of the outer ring may be removed. An opening is thus created in the stiffener ring. The inner ring 35 remains intact and delimits the opening and can provide the required stiffness to avoid deformation of the partially disassembled stator.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. An electrical machine, comprising:
   a rotor;
   a stator;
   a radial air gap between the rotor and the stator;
   one of the rotor and the stator comprising an endplate on one side of the electrical machine:
   a central support radially surrounding the other one of the rotor and the stator;
   a stiffener ring on an opposite side of the electrical machine, the stiffener ring comprising an unsupported radially inner end;
   the stiffener ring comprising an outer ring connected to the central support, and an inner ring connected to the outer ring; and
   the outer ring comprising a plurality of removably mounted outer annular segments.

2. The electrical machine of claim 1, wherein the outer annular segments are mounted to the central support and to the inner ring.

3. The electrical machine of claim 1, wherein the inner ring comprises a plurality of inner annular segments, and joining plates connected the inner annular segments.

4. The electrical machine of claim 1; wherein the outer annular segments are configured for mounting of a tool used to remove the annular outer segments.

5. The electrical machine of claim 1, wherein the inner ring is configured for mounting a tool used to remove the annular outer segments.

6. The electrical machine of claim 1, wherein the electrical machine is a generator.

7. The electrical machine of claim 6, wherein the endplate is connected to a rotor shaft.

8. The electrical machine of claim 7, wherein the rotor shaft is supported on a main frame.

9. The electrical machine of claim 8, wherein the rotor shaft is supported by a front bearing and a rear bearing.

10. The generator of claim 6, wherein the stator radially surrounds the rotor, and wherein the endplate of the stator is arranged on a side of the rotor where a wind turbine rotor is arranged.

11. A wind turbine comprising the electrical machine of claim 6.

12. A method for repairing a part of an electrical machine having a rotor, a stator, and a radial air gap between the rotor and the stator, the method comprising:
    removing a segment of a stiffener ring on a side of the electrical machine to create an opening in the stiffener ring, wherein the stiffener ring is unsupported at a radially inner end of the stiffener ring;

accessing the rotor or the stator though the opening in the stiffener ring;

wherein the stiffener ring comprises an outer ring and an inner ring; and wherein removing the segment of the stiffener ring includes removing a segment of the outer ring without disassembly of the inner ring.

13. The method of claim 12, comprising removing more than one segment of the outer ring while the inner ring is not disassembled.

14. The method of claim 12, further comprising removing one or more active parts of the electrical machine through the opening in the stiffener ring.

15. The method of claim 12, wherein removing the segment of the outer ring comprises mounting a tool to the stiffener ring, and disassembling the segment of the outer ring with the tool.

\* \* \* \* \*